Aug. 11, 1970   R. W. REICH   3,524,118
ELECTRONIC OSCILLATING MOTOR TIMEPIECE DRIVE
Filed Sept. 21, 1967
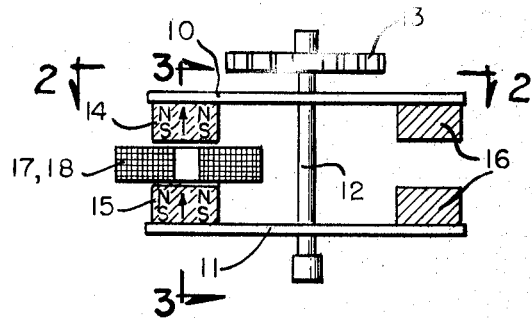
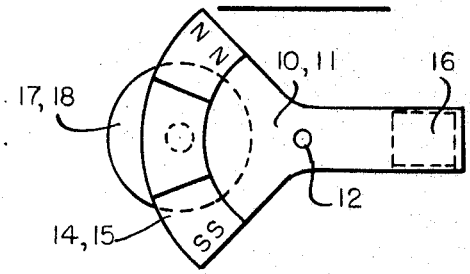
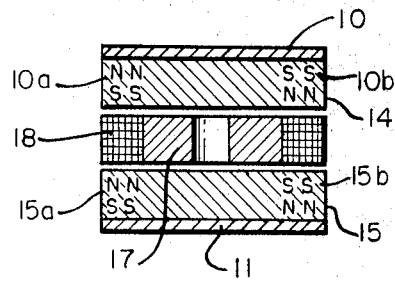
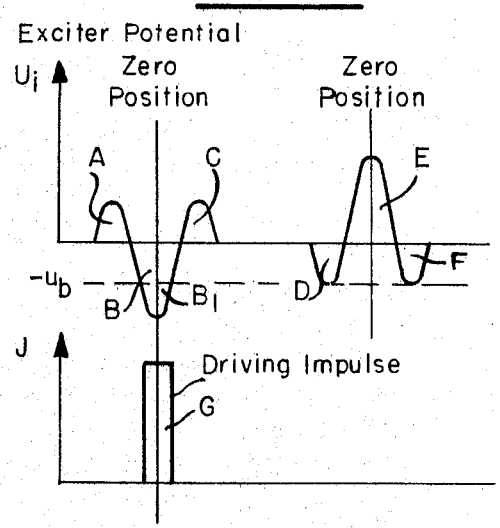
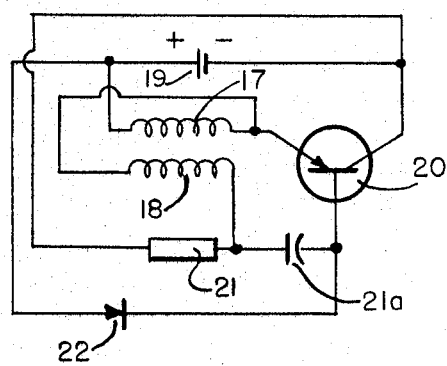
INVENTOR
Robert Walter Reich
BY Robert R. Priddy
ATTORNEY United States Patent Office 3,524,118
Patented Aug. 11, 1970

3,524,118
ELECTRONIC OSCILLATING MOTOR
TIMEPIECE DRIVE
Robert Walter Reich, Merzhauserstr. 143,
Freiburg im Breisgau, Germany
Filed Sept. 21, 1967, Ser. No. 669,455
Int. Cl. H02k 33/00
U.S. Cl. 318—128                                5 Claims

ABSTRACT OF THE DISCLOSURE

A balance wheel or vibrator assembly is mounted for oscillation about an axis, and consists of iron vanes having permanent magnets disposed thereon for oscillatory motion with said vanes past an exciter coil/driving coil assembly. The magnets are bipolarly magnetized in an axial direction, and are so disposed relative to the exciter and driving coils that, in the null position of the vibrator assembly, a maximum amount of magnetic flux passes through the exciter coil.

BACKGROUND OF THE INVENTION

The present invention comprises an improvement in electronic timepiece drives of the types shown in Lavet et al., U.S. Pat. No. 2,986,683 and Reich U.S. Pat No. 3,040,225. In arrangements of these known types, permanent magnets are carried by iron supporting structures, with the overall arrangement being mounted to swing through a limited arc in an oscillatory motion past a pair of coils acting respectively as an exciter coil and a driving coil. The coils are connected to a transistor circuit operative to generate a pulse of current in the driving coil in response to induction of an appropriate current pulse in the exciter coil whereby the oscillatory motion of the system, once commenced, is sustained by the interaction of the permanent magnet and driving coil fields.

In the arrangement of the aforementioned Lavet et al. patent, a balance wheel or vibrator assembly is provided comprising magnetized segments arrangement on opposite sides of the coil structure, either on a pair of vanes disposed respectively above and below a composite exciter coil/driving coil assembly, or on three such vanes having separate driving and exciter coils disposed respectively between different pairs of such vanes. In either case the magnet segments carried by or forming a portion of said vanes are magnetized in a tangential direction relative to the axis of oscillation.

In such a tangentially magnetized system, a pulse is generated in the null position of the vibrator assembly which is twice as long as two short impulses generated outside of the null position; i.e., a total of three impulses are produced which differ from one another only in length. These different length impulses, produced by the tangentially magnetized arrangements of the prior art, militate against true isochronism. Moreover, in such tangentially magnetized arrangements, the oscillating system has a rather strong stray field. As a result, any ferromagnetic structures which are located in the general vicinity of the vibrator assembly tend to distort the field and greatly interfere with the isochronism of the timepiece. Indeed, in the case of such tangential magnetization, the overall vibrator assembly becomes sensitive to the earth's magnetic field; and variations in physical position of the overall vibrator assembly relative to the earth's magnetic field can affect the timing cycle.

SUMMARY OF THE INVENTION

The improvement of the present invention avoids the various disadvantages discussed above by employing a vibrator assembly utilizing magnet segments which are magnetized in an axial direction relative to the axis of vibration. The vibrator assembly can comprise a pair of iron vanes mounted on an axis and positioned above and below a coil assembly respectively. One or both of these vanes can be provided with bipolarly magnetized segments, or individual permanent magnets can be affixed to one or both vanes in accordance with a particular arrangement to be described. In either case, the direction of permanent magnetization is such that the magnetic poles are disposed axially, rather than tangentially, relative to the axis of vibration of the vibrator assembly. The advantages of this arrangement include the elimination of stray fields, and marked improvement in the efficiency of the system. Above all, any secondary impulses which are generated are so slight in amplitude and duration that they have practically no effect on the drive itself, i.e., they neither hamper nor favor the driving cycle. Moreover, by utilizing such axial magnetization, the vibrator assembly becomes insensitive to positioning relative to the earth's magnetic field, and is unaffected by ferromagnetic devices located in the general vicinity of the magnetized vibrator assembly.

In one embodiment of the invention, one only of the vanes is provided with a magnetic segment having axial bipolar magnetization, or with a pair of individual spaced permanent magnets having such axial bipolar magnetization; and the return path for flux is created through the other iron vane. Alternatively, both vanes can be provided with segments or individual magnets, with the magnets on each vane being of opposite magnetic polarity, respectively, and being positioned in series aiding relation to the magnets on the other vane. The coil assembly is located between these vanes; and this assembly comprises exciter and driving coils which are either wound concentrically about one another, or which are wound together bifilarly or in superimposed discs.

In all of the arrangements constructed in accordance with the present invention, the axially polarized vane assembly is so disposed relative to the exciter and driving coils that the magnetic field is, in effect, "focussed" relative to the coils, with the flux passing axially directly through the coil assembly wihout any significant stray field. Moreover, the positioning of parts is such that the total magnetic flux passing through the exciter coil, or through the exciter coil portion of a composite coil assembly, reaches a maximum when the vanes of the vibrator assembly are in their null position relative to the coils. The coils can be associated with an appropriate transistor circuit operating as a block oscillator; and the transistor can be so biased that impulses occurring outside of the null position are suppressed. The overall arrangement thus operates to produce a flow of current through the driving coil only in the null position of the assembly, and then only once for each full oscillation of the balance wheel or vibrator structure.

BRIEF DESCRIPTION OF THE DRAWINGS

FIG. 1 is a diagrammatic cross-sectional view of a timepiece drive assembly constructed in accordance with the present invention;

FIG. 2 is a diagrammatic plan view of a portion of the structure shown in FIG. 1, taken on line 2—2 of FIG. 1;

FIG. 3 is a diagrammatic end view of the structure shown in FIG. 1, taken on line 3—3 of FIG. 1, and illustrating an alternative form of coil assembly which can be employed;

FIG. 4 is a schematic diagram of a blocking oscillator arrangement which can be employed with the vibrator assembly of FIGS. 1–3; and FIG. 5 is a graphical representation of the operation of the vibrator assembly of FIGS. 1–3 when employed in a circuit arrangement of the type shown in FIG. 4.

DESCRIPTION OF THE PREFERRED EMBODIMENTS

As shown in FIGS. 1 and 2, a vibrator or balance wheel structure constructed in accordance with the present invention may comprise two vanes 10 and 11 mounted on a balance wheel shaft 12 in axially spaced relation to one another, said vanes being fabricated of soft iron or other appropriate magnetic material. A spiral spring 13 may be affixed to shaft 12 in the manner, and for the purposes, described in the aforementioned Lavet et al. Pat. No. 2,986,683.

Portions of one or both of vanes 10 and 11 may be bipolarly magnetized in the manner to be described, or individual magnets may be affixed to one or both of said vanes. In the particular example shown in the drawings, segment-shaped permanent magnets 14 and 15 are mounted on both vanes 10 and 11 respectively. The vanes 10 and 11 are, as best illustrated in FIG. 2, elongated in shape; and magnets 14 and 15 are mounted at one end of each of these elongated pieces, which one end is preferably flared outwardly as illustrated in FIG. 2. Compensating weights 16 are disposed at the other or narrower ends of the iron pieces or vanes 10 and 11.

As best illustrated in FIG. 1, the magnets 14 and 15 are not magnetized tangentially, but are magnetized axially in a direction generally parallel to the direction of balance wheel shaft 12. The magnetization is, moreover, such that two pairs of opposite polarity, axially disposed poles are located on or supported by each vane 10 and 11. The pairs of poles on each vane are angularly spaced from one another in the direction of rotation of the vane, and each pair of poles is spaced radially from shaft 12. Thus, as best illustrated in FIG. 3, the vane 10 for example may have a pair of angularly spaced, axially magnetized, poles 10a and 10b adjacent to its opposing edges respectively, these two pairs of poles being of opposite axial polarity to one another; and similar such pairs of opposite axially magnetized poles 15a and 15b may be formed at or supported adjacent the opposing edges of vane 11.

When two pairs of poles are formed on each vane, as illustrated, each pair of poles is disposed in axial alignment with, and in series aiding relation to, a pair of poles on the other vane. It will be appreciated, however, that axially magnetized bipolar segment shaped magnets, or a pair of angularly spaced magnets, disposed in the manner described need be provided on one only of the vanes 10 and 11; and in such event, the other vane can act as a flux return path.

The vanes 10 and 11 and their associated magnet segments 14 and 15 are disposed on opposite sides of a coil assembly comprising a driving coil 17 and an exciter coil 18. The coils 17 and 18 can be wound bifilarly to form, in effect, a single coil as illustrated in FIGS. 1 and 2; or, as illustrated in FIG. 3, the coil assembly may comprise a pair of concentrally disposed coils having the driving coil 17 disposed within the exciter coil 18. In either arrangement, the exciter coil 18 is located directly between the aligned axially magnetized poles 10a–15a and 10b–15b when the balance wheel or vibrator assembly is in its null position. Accordingly, in said null position, a maximum amount of total flux passes through the exciter coil 18, and the amount of total flux linking the coil 18 decreases when the vibrator assembly departs from said null position in either direction of its oscillatory motion.

As will be appreciated from consideration of the directions and locations of the poles 10a–10b and 15a–15b relative to the coil assembly 17–18, the direction of the flux through the coil assembly is directly axial, thereby eliminating stray fields and increasing the efficiency of the overall system. This axial magnetization thus avoids the difficulties which have been described previously with respect to tangential magnetization systems.

In the arrangement of FIG. 2, the arcuate extents of magnet segments 14 and 15 are such that the segments extend beyond the periphery of coil assembly 17–18. The positioning of the parts is such that, in the null position of the vibrator assembly, one pair of poles is just leaving the exciter coil as the other pair of poles starts to pass over the exciter coil. This arrangement results in both pairs of poles acting together to produce a driving impulse having an amplitude twice as high, without any changes in the width of the driving impulse, as would be achieved if only one pair of poles acted at any given time to generate the pulse. This same consideration applies to the arrangement of FIG. 3.

The coil assembly 17–18 can be coupled to a transistor circuit adapted to detect the induction of a potential of proper polarity and amplitude in the exciter coil 18, and operating in response thereto to produce an appropriate driving impulse in the driving coil 17. One such arrangement is shown in FIG. 4, wherein the driving coil 17 is connected in series with a battery supply 19 between the emitter and collector of a transistor 20, and the exciter coil 18 is connected between the emitter and base of said transistor 20. The circuit arrangement may further include a resistor 21, and a capacitor 21a, connected as shown to give the circuit self-starting properties generally similar to those described in my prior copending application Ser. No. 616,865, filed Feb. 17, 1967, for "Electrical Self-starting Time Keeping Apparatus." A diode 22, connected in the collector-base circuit, may also be provided for damping oscillations in the overall circuit. Preferably, means are also provided to stabilize the circuit against voltage and temperature variations.

The overall arrangement of FIG. 4 acts as a self-starting blocked oscillator; and the base of transistor 20 is preferably appropriately biased so that a current impulse can be generated in the driving coil 17 only when a potential of proper polarity, and having an amplitude in excess of a predetermined bias or threshold value, is induced in the exciter coil 18. These considerations are shown in the curves of FIG. 5.

In operation, as the vane structure 10–11 oscillates, the cooperating pairs of magnetic poles 10a–15a and 10b–15b will periodically pass in succession over the coil assembly 17–18 to and from locations disposed completely outside of the coil assembly. As the poles move toward the coil assembly, a first pair of bipolar magnets, e.g., 10a and 15a, will pass over a portion of exciter coil 18; and this will induce a relatively small potential in coil 18, e.g., the positive-going pulse designated A in FIG. 5. Pulse A has a polarity such that transistor 20 is not driven into conduction. As the vane assembly continues its movement in the same direction, the pair of magnets 10a and 15a will approach the opposite side of the exciter coil assembly 18 at the same time that bipolar magnets 10b and 15b approach the first mentioned side of exciter coil 18. A relatively large potential of opposite going polarity, designated B in FIG. 5, will accordingly be generated in the exciter coil 18; and this potential B reaches a maximum value at the null or zero position of the vibrator (illustrated in FIGS. 2 and 3). The magnitude of pulse B overcomes the threshold or bias value of transistor 20, designated $-u_b$ in FIG. 5; and the portion of the pulse B designated $B_1$ in FIG. 5 will unblock the transistor 20 and generate a driving impulse G in the driver coil 17.

As the vane assembly continues its movement in this assumed direction of oscillation, the magnet pairs 10a and 15a will leave the vicinity of coil assembly 17–18, and the trailing pair of poles 10b and 15b will pass over the trailing edge of the coil assembly 17–18 to induce a further positive-going pulse C of relatively small amplitude in the exciter coil 18. However, for the reasons given with respect to pulse A, the pulse C does not have proper amplitude or polarity to unblock transistor 20. When the vane assembly 10–11 reverses its direction of motion a further sequence of pulses D, E, and F will be generated in exciter coil 18. The pulses D and F are of proper polarity to unblock transistor 20, but are of insufficient amplitude to overcome the bias on said transistor. The pulse E is of improper polarity to unblock the transistor 20. The further series of pulses D, E, and F is thus ineffective to produce a driving impulse in driving coil 17.

By reason of the sequence of operations thus described, it will be seen that only one driving impulse G is generated in driving coil 17 for each complete cycle of oscillation of the vibrator assembly. Pulse G is generated when the vibrator assembly reaches one of its null positions relative to the coils, and then only when the vibrator assembly is in a fully oscillating condition capable of producing a pulse not only of proper polarity but also of proper amplitude to overcome the bias on transistor 20.

While I have thus described a preferred embodiment of the present invention, many variations will be suggested to those skilled in the art. The foregoing description is therefore meant to be illustrative only, and should not be considered limitative of my invention. All such variations and modifications as are in accord with the principles described are meant to fall within the scope of the appended claims.

Having thus described my invention I claim:

1. An impelling and pulse controlling system for an electronic clock comprising a pair of supporting plate members mounted for common oscillatory motion on a shaft, said plate members each comprising a magnetic material and being positioned in substantially parallel axially spaced relation to one another along said shaft, magnet means on at least one of said plate members, said magnet means comprising a magnet segment on said one plate member having axially magnetized pole portions at spaced portions thereof, said magnet means defining a first pair of opposing magnetic poles on said one of said members directed in an axial direction to said shaft at a position radially spaced from said shaft, said magnet means further defining a second pair of opposing magnetic poles on said one of said members, said second pair of poles also being directed in an axial direction, said second pair of poles being radially spaced from said shaft and being angularly spaced from said first pair of poles in a circumferential direction about said shaft, a coil assembly comprising an exciter coil and a driving coil positioned between said pair of plate members, said exciter coil being so sized and positioned relative to the positions of said first and second pairs of poles that said first and second pairs of poles act together to produce a maximum total flux in opposing axial directions through circumferentially spaced portions of said exciter coil between said magnetic plate members when said plate members are in a preselected null position relative to said coil assembly, and produce a total axial flux less than said maximum flux through said exciter coil when said pair of plate members depart from said preselected null position, and control means selectively responsive to the induction of potentials in said exciter coil for generating pulses in said driving coil.

2. The system of claim 1 wherein the other of said supporting plate members supports a second magnet means comprising a second magnet segment having axially magnetized pole portions at spaced portions thereof, said second magnet means defining third and fourth pairs of axially magnetized poles, said third pair of poles being positioned in axial alignment with said first pair of poles and in magnetically aiding relation to said first pair of poles, and said fourth pair of poles being positioned in axial alignment with and magnetically aiding relation to said second pair of poles.

3. The system of claim 1 wherein said control means comprises a transistor coupled to both said driving and exciter coils, and means coupled to said transistor to form a blocking oscillator circuit operative to produce a pulse of current in said driving coil only in response to the induction of a potential in said exciter coil having a predetermined polarity and an amplitude greater than a predetermined value.

4. The system of claim 3 wherein said driving coil is connected in the emitter-collector circuit of said transistor, said exciter coil being connected in the emitter-base circuit of said transistor, and resistance-capacitance means connected to said transistor and to a power supply for effecting self-starting of the oscillatory motion of said plate members.

5. The system of claim 3 wherein said exciter coil is connected in the emitter-base circuit of said transistor, said driving coil being connected in the emitter-collector circuit of said transistor, and oscillation damping means comprising a diode connected in the collector-base circuit of said transistor.

References Cited

UNITED STATES PATENTS

| | | | |
|---|---|---|---|
| 2,986,683 | 5/1961 | Lavet et al. | 318—132 |
| 3,312,883 | 4/1967 | Reich | 318—132 |
| 3,336,537 | 8/1967 | Reich | 331—116 |
| 3,359,473 | 12/1967 | Negri | 318 —128 |
| 3,465,510 | 9/1969 | Jeanmonod | 58—28 |

FOREIGN PATENTS

| | | |
|---|---|---|
| 1,224,395 | 6/1960 | France. |
| 1,055,295 | 1/1967 | Great Britain. |

DONOVAN F. DUGGAN, Primary Examiner

U.S. Cl. X.R.

58—23, 28; 331—116; 318—132